UNITED STATES PATENT OFFICE.

JAMES L. HASTINGS, OF PHILADELPHIA, PENNSYLVANIA, ASSIGNOR TO THE WELSBACH INCANDESCENT GAS LIGHT COMPANY, OF NEW JERSEY.

PLASTIC MINERAL COMPOSITION.

SPECIFICATION forming part of Letters Patent No. 400,335, dated March 26, 1889.

Application filed September 27, 1888. Serial No. 286,582. (No specimens.)

*To all whom it may concern:*

Be it known that I, JAMES L. HASTINGS, a citizen of the United States, residing at Philadelphia, in the county of Philadelphia and State of Pennsylvania, have invented new and useful Improvements in Plastic Mineral Compositions, of which the following is a specification.

This invention relates to new plastic mineral compositions and vitreous or crystalline compounds for use in chemical or other arts and for incandescent illumination by means of a gas-flame or other source of heat, said composition being adapted for molding into articles of various forms and for coating metallic and other articles to protect them from the oxidizing and corroding influence of air, moisture, acids, &c., and from injury by heat. The plastic compound, when properly burned or fired, is highly refractory, very hard, crystalline in structure, rough on the surface, white or opalescent, and practically infusible.

The object of the invention is to produce a readily-incandescent compound, capable of resisting the action of intense heat, and particularly adapted for forming incandescent burners or attachments for burners for illumination with coal-gas, water-gas, or natural gas, or other source of heat.

The plastic compound is formed of a mixture of ingredients in about the following proportions:

| | Grains. |
|---|---|
| Magnesium oxide | 250 |
| Uranium oxide | 2¼ |
| Calcium fluoride (for flux) | 60 |
| Starch | 50 |
| Gum-tragacanth | 100 |
| | 462¼ |

A distinguishing feature of this invention is the compound or substance—such as oxide of uranium—used to modify or give color to the light of the incandescing compound. Another important and distinguishing feature is the starch or mucilaginous gum used for improving the quality of the plastic compound and the resulting baked articles, as below described.

The gum-tragacanth is treated with or prepared in a watery solution of one or more of the acetates, which may be used in the following proportions:

| | Grains. |
|---|---|
| Magnesium acetate | 150 |
| Calcium acetate | 50 |
| Strontium acetate | 50 |
| Aluminum acetate | 15 |
| | 265 |

The gum swells up this liquid, forming a transparent jelly-like or mucilaginous matter, and I find that one hundred grains, as stated in the formula above, is about the proper proportion to use in the plastic compound for mixing and pressing preparatory to molding into rods, tubes, or other forms required for use. I have also used Bassora gum and that class of mucilaginous matter termed "bassorine," and it may be prepared in a watery solution of the following salts:

| | Grains. |
|---|---|
| Magnesium chloride | 200 |
| Strontium chloride | 100 |
| Calcium chloride | 100 |
| | 400 |

The bassorine swells up this liquid, and has proved very useful in the preparation of material for molding into the desired form. I preferably use, however, the gum-tragacanth, that which is graded by dealers as No. 1 and prepared for use in the watery solution of acetates, as above stated. I have also obtained good results from a watery solution of the following salts:

| | Grains. |
|---|---|
| Magnesium nitrate | 100 |
| Calcium nitrate | 25 |
| Strontium nitrate | 25 |
| | 150 |

I have also had satisfactory results from the combination of acetates, clorides, and nitrates dissolved in water, each in about the proportion as stated herein. The gum preparation may be strained through cloth and bottled for use, if desired. Good results may be obtained from soaking the gum in water alone or in water with a little acid.

In preparing the plastic composition according to the above formula for molding, I first reduce the calcium fluoride to an impalpable powder and then add the starch and thoroughly mix these two ingredients together.

I have in view the accomplishment of three objects by using the starch—

First. To carry or support the calcium fluoride, which is very heavy, so that it can be thoroughly mixed and incorporated with the magnesium oxide, which is very light, (preferably the light calcined,) in order that the calcium fluoride (the flux) shall be uniformly distributed throughout the mass, so that when fired or baked in the furnace the material will possess uniform strength.

Second. For the purpose of grading or regulating the weight and the thickness of the finished material. For instance, if in preparing tubes the material is thought to be too heavy when they are fired and it is desired to reduce the weight and thickness of the walls of the tube without changing the molds for that purpose, then one-fourth or one-third or other desired quantity of starch may be used to secure the desired result, because it burns out in the heat of the furnace, and the tubes or other forms shrink in proportion to the amount of starch used, and, leaving the finished material lighter and thinner, does not require so much heat to produce the required incandescence.

Third. For the purpose of providing a residue of carbon, which is left in the tubes or rods after burning in the furnace, which carbon is afterward burned out when the material in the form of tubes or rods is used in lamps or other illuminating apparatus. The burning out of such carbon serves a useful purpose, because it leaves the material in a porous state, admitting the heat more freely to all its atoms and giving rise to improved results in producing higher and more brilliant incandescence for the same units of heat, thereby enhancing its value as an incandescent material.

I have used gluten, iodine of starch, dextrine, glucose, and such like material; but I find the common dry starch suits the purpose very well. The calcium fluoride and starch having been thoroughly mixed, I then add the magnesium oxide and the uranium oxide and stir them until the starch and fluoride are thoroughly disseminated with them. The plastic batch is then ready to be mixed with the prepared gum, as stated above, and after thoroughly mixing by stirring and pressing it is ready for molding into the form desired. By use of the gum I am enabled to mold tubes or slender rods anywhere from ten to thirty feet in length, and can run them on a reel like hose on a hose-cart reel.

The plastic composition is molded into slender rods or pencils and into tubes or other forms, and may be coated upon articles of metal or other material, and in such forms is subjected to a low drying temperature, to drive off the moisture or more volatile matter, and then to a high temperature in a gas or other furnace, and may afterward be suspended in a gas-flame for completing the process of burning and for testing and proving the finished article.

The proportions of mineral ingredients, above mentioned, for forming the compounds and various forms of burners and burner attachments, give satisfactory results; but I do not limit myself to the proportions stated, as other proportions will give good results, and they may be varied without departing from my invention.

What I claim is—

1. A composition for forming a refractory compound, containing magnesium oxide, uranium oxide, calcium fluoride, starch, and a prepared gum or mucilaginous substance.

2. A composition for forming a refractory compound, containing magnesium oxide, uranium oxide, calcium fluoride, starch, and gum-tragacanth or bassorine, and a solution of one or more salts of acetate, chloride, or nitrate of magnesium, strontium, calcium, or aluminum.

In testimony whereof I affix my signature in presence of two witnesses.

JAMES L. HASTINGS.

Witnesses:
THOMAS S. WILTBANK,
JAMES M. WEST.